May 1, 1951  A. M. COHEN  2,550,778
ELECTRIC TIMER
Filed May 13, 1947  2 Sheets-Sheet 1
FIG. 1
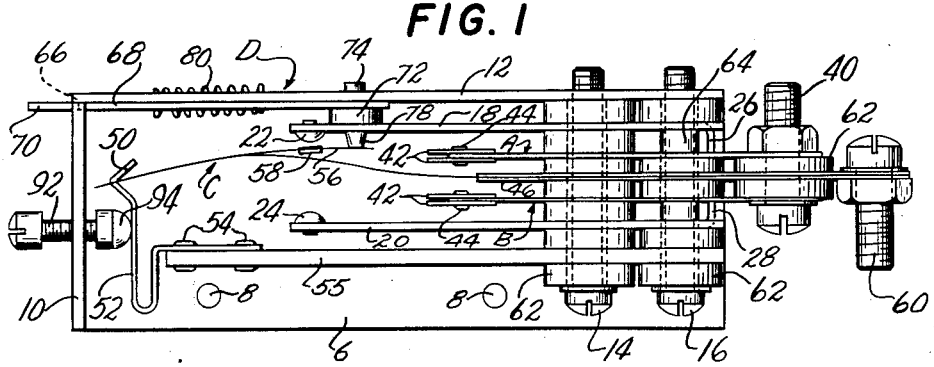
FIG. 2
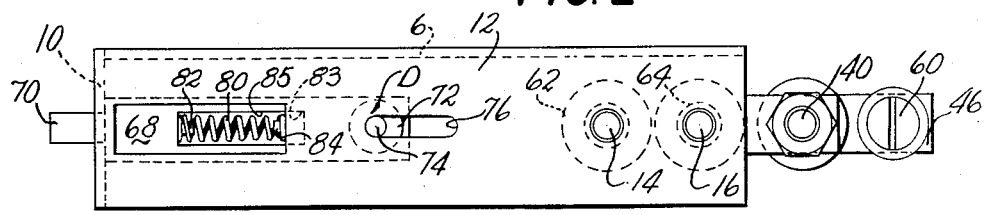
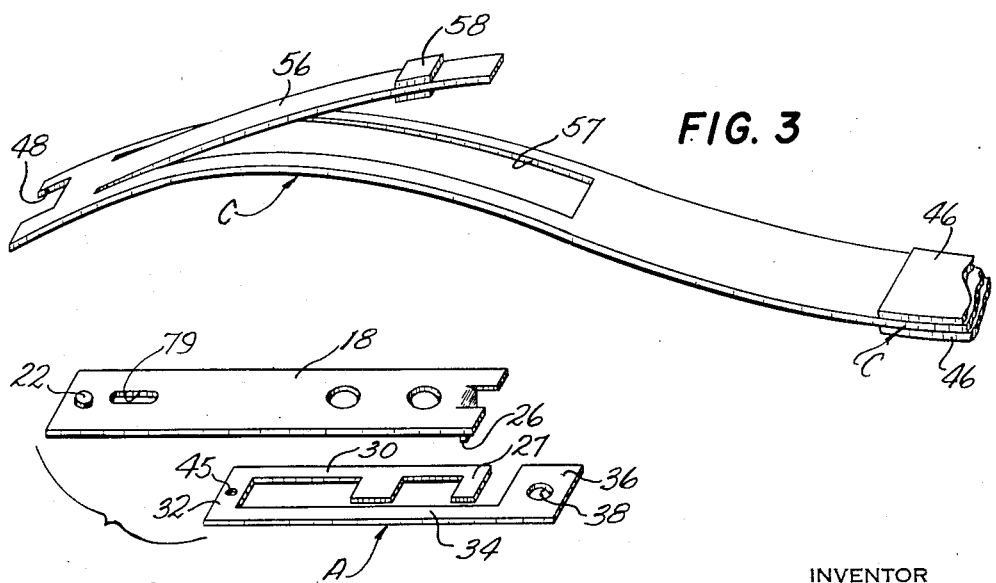
FIG. 3
FIG. 4
INVENTOR
ARTHUR M. COHEN
BY
James & Franklin
ATTORNEYS May 1, 1951  A. M. COHEN  2,550,778
ELECTRIC TIMER
Filed May 13, 1947  2 Sheets-Sheet 2

INVENTOR
ARTHUR M. COHEN
BY
James & Franklin
ATTORNEYS

Patented May 1, 1951

2,550,778

UNITED STATES PATENT OFFICE 2,550,778

ELECTRIC TIMER

Arthur M. Cohen, New Rochelle, N. Y.

Application May 13, 1947, Serial No. 747,874

16 Claims. (Cl. 161—1)

This invention relates to an electric timer, and more particularly to such a device employing a pair of thermally responsive elements for measuring a time interval.

Timers have been known in the past which measure the time interval by the amount of time a thermally responsive element, such as a bimetallic strip, required to bend a certain amount or to perform a certain amount of work when that thermally responsive element was heated. With such timers, however, it was of course necessary, before the timer would be in condition to re-measure the same time interval, that the heated thermally responsive member cool to a uniform initial temperature. This meant that a considerable time had to elapse before the timer was incondition for its next actuation. This drawback is particularly severe when such timers are employed with various cooking devices, suc has toasters or waffle irons, these instruments very often being employed in a series of cooking operations one immediately following the other.

Various expedients have in the past been proposed to eliminate this defect. It has, for example, been suggested to provide a plurality of thermostatic elements only one of which is to be used at a time, so that a fresh and cool thermostatic element is always available. This expedient not only necessitates an excessive number of thermostatic elements but also, if the timing intervals are to be the same, requires that all of them be identically responsive to heat, thus requiring careful selection and matching of thermostatic elements and making replacement of a defective element extremely difficult and expensive.

Another expedient which has been suggested is to employ but a single thermostatic strip and to utilize both its heating and its cooling periods for determining the desired time interval. To accomplish this result, relatively complicated and delicate circuit connections and apparatus must be provided. In addition, in such devices the heating period is ordinarily considerably shorter than the cooling period, so that the primary control over the determination of the time interval occurs during the cooling period when the thermostatic element is most susceptible to undesired outside influences such as ambient temperature. Even when some control by ambient temperature is desired, as for example in the case of toasters where the toasting of a slice of bread to a desired degree in a cold toaster should take longer than toasting to the same degree in a hot toaster, the results are not at all dependable.

In the timer of my invention two thermally responsive elements are employed and the timing interval determined represents the sum of two sub-intervals, each of the latter being determined by the heating time of one of the thermostatic elements. These elements are arranged to be energized or heated in sequence, and consequently the first heated thermostatic element is cooling while the second heated thermostatic element is heating. Therefore, after the time interval has been determined, that is to say, after the second thermostatic element has completed its heating period, the first thermostatic element has cooled to its initial temperature and the timer is therefore in condition for immediate reactuation. If the thermostatic elements of my timer be exposed to ambient temperature, as would be desirable in the case of a toaster, the heating times thereof and therefore the time interval determined would be modified thereby, the greater the ambient temperature the less the time interval, and this despite the fact that only the heating time and not the cooling time of the thermostatic elements are employed in the time measure.

This invention is susceptible of employment either to control electrical connections to the heating element of a cooking device, or to control mechanical means, as for example in a pop-up type of toaster, or both. My timer may be adapted for any type of timing desired, and is not limited to employment in cooking devices such as toasters.

It is the prime object of the present invention to provide a timer which measures a time interval and which, after such measurement, is available for immediate re-use.

It is another object of the present invention to provide such a timer which employs a pair of thermally responsive members and which utilizes only the heating times of those members to determine the time interval.

It is still another object of the present invention to provide such a timer in which the thermostatic elements are heated alternately in sequence so that while the second thermostatic element is being heated to measure a portion of the time interval the first thermostatic element is cooling so as to be in condition for immediate re-energization when the complete time interval has been determined.

Yet another object is to provide such a timer which may be employed to control either electrical circuits, mechanical motion, or both.

A further object is to provide a timer construction which is compact and which is simple in operation and in which parts may be easily replaced.

Another object of the invention is the provision in a timer as above described of manually adjustable means for varying the time interval measured by the timer.

It is yet another object of the present invention to provide a timer in which motion of the thermally responsive members during heating automatically control the sequence in which these thermostatic elements are exposed to heat, and also control either the electrical connections to or the mechanical motion of the device being timed.

The provision of a novel initiating means sensitive merely to an impulse or momentary pressure, said initiating means being particularly cooperable with the thermostatic timer of my invention, also comes within the scope of my invention.

To the accomplishment of the foregoing objects and such other objects as may hereinafter appear, the present invention relates to a thermostatic timer as defined in the appended claims and as described in this specification taken together with the accompanying drawings, in which:

Fig. 1 is a side view of a timer;

Fig. 2 is a top view thereof;

Fig. 3 is a perspective view of the snap spring employed therein;

Fig. 4 is an exploded view of a typical thermostatic element and of the terminal bar thereof;

Figure 5:
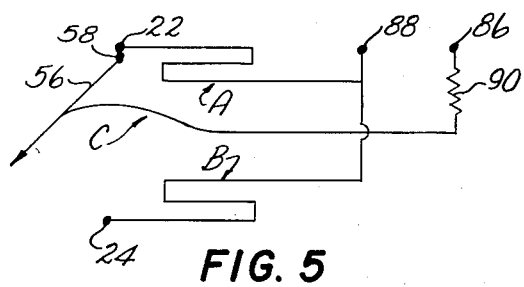
Figs. 5 and 6 are schematic circuit representations illustrating the positions which the various elements of the timer assume during various stages of the timing operation.

Generically considered, my timer comprises a pair of heat-responsive elements A and B, here illustrated as conventional bimetallic bars which tend to bend when heated. Means are provided for heating each of these elements. In the preferred embodiment illustrated in Figs. 1 through 7, these elements are heated by causing an electric current to pass directly through them, this expedient being well-known in the art. In Fig. 8, separate electrical heaters 2 and 4 are provided, one for each strip A and B. Either of these arrangements may be employed. A means C, illustrated in Figs. 1 through 7 and 9 as a snap spring, is provided for causing these elements to overcome force during the heating period, and circuit connections are provided so that the elements are heated in sequence. An initiating means generally designated D is provided to start the operation of the timer, the means D automatically resetting itself at some time during the timing period so as to be ready for re-actuation for the next timing operation.

In the embodiment of Figs. 1 through 6, which is illustrative of one form which my invention may take, a frame is provided which may consist of a back wall 6 having holes 8 therein so that the unit may be attached to any desired structure, a side wall 10, and a top wall 12. Bimetallic strips A and B are arranged in parallel and spaced apart relationship by means of screws 14 and 16 cooperating with suitable apertures in the top wall 12. The strips are so positioned that when heated each tends to bend toward the other. Also mounted in parallel and spaced apart relationship on either side of the bimetallic strips A and B are a pair of terminal bars 18 and 20 which carry terminals 22 and 24 at their outer ends and which at their inner ends make electrical contact with the bimetallic strips A and B respectively by means of ears 26 and 28. The bimetallic strips may be shaped as illustrated in Fig. 4 so that the ear 26 makes contact with the ledge 27, current then flowing along the arms 30, 32 and 34 of the bimetallic strip to the connecting portion 36 which makes contact at hole 38 with terminal screw 40. The terminal screw 40 is simultaneously electrically connected to both bimetallic strips A and B. Each of the bimetallic strips may carry at its free or bending end a pair of mica washers 42 secured thereto by rivet 44 passing through rivet hole 45.

Interposed between the two bimetallic strips A and B is a snap spring C one end of which is clamped between lugs 46 and the other end of which is notched at 48 so as to receive therein the end 50 of adjustment spring 52, the latter being fastened by means of rivets 54 to support 55. The snap spring C is formed of conductive material such as phosphor bronze, and is centrally cut away at 57 so that a tongue portion 56 of the spring defines a resilient contact finger which bears contact blocks 58, these contact blocks being so positioned as to make contact with the terminals 22 or 24 depending upon the position of the snap spring C. To the extremity of the spring C which is fastened between the lugs 46 is electrically connected a terminal screw 60. The terminal screw 40 passes through an enlarged hole in the spring C and in the lugs 46 so that it makes no electrical contact with either.

The action of the adjustment spring 52 on the snap spring C is to cause the latter to buckle, as illustrated in the drawings, and thus to itself project toward one or the other of the thermostatic elements A or B to cause the contacts 58 on the contact finger 56 to resiliently tend to make contact with either of the terminals 22 or 24.

All of the elements of the timer which are secured together by screws 14 and 16, that is to say, the support 55, the terminal bar 20, the bimetallic strip B, the snap spring C and lugs 46, the bimetallic strip A, and the terminal bar 18, are insulated from one another by means of porcelain bushings 62, and the screws 14 and 16 are insulated from all of the elements by means of porcelain bushings 64.

Push bar 68 is slidably mounted on top wall 12, is provided at one end with finger piece 70 which projects through opening 66 in side wall 10, and carries at its other end an insulating element 72 having a shank 74 projecting through slot 76 in the top wall 12, and having a lower portion 78 projecting through slot 79 in the terminal bar 18 and engaging with the tip of the contact finger 56 in such a manner as to retain the contact 58 away from the terminal 22. The element 72 is itself larger than either slot 76 or 79, so that the push bar 68 is held in slidable parallel relationship with the top wall 12 and the terminal bar 18. Spring 80 is maintained in compression, one end thereof encompassing lug 82 on the push bar 68, the latter being slotted at 83 to accommodate the spring, and the other end thereof encompassing lug 84 fastened to the opposite end of slot 85 in top wall 12. The spring 80 thus resiliently biases the push bar 68 to its position illustrated in Figs. 1 and 2, hereafter termed its operative position, in which electrical connection between contact 58 and terminal 22 is prevented. If, however, the finger piece 70 be pushed against the tension of the spring 80, the button 72 will be moved to an inoperative position in which its portion 78 will no longer interfere with the resilient motion of the contact finger 56 toward terminal 22 so that electrical contact will be initiated between the contact 58 and the terminal 22. When this takes place the tip of the contact finger 56 will engage the lower portion 78 of the element 72 to obstruct return of the push bar 68 and element 72 to operative position.

Figure 6:
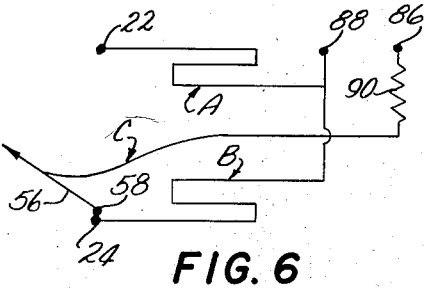

Having reference now particularly to Figs. 5 and 6 which schematically illustrate the positions which the various elements assume during a timing operation, 86 and 88 represent connections to a source of electric power. The resistor 90 may represent the heating coils of an electric toaster with which the timer may be employed. Fig. 5 represents the circuit connections just after the button 72 has been moved to its inoperative position so that electrical connection is made between contact 58 and terminal 22. Current then flows from terminal 86 through the toaster heating coils 90 and then, via terminal screw 60, through the snap spring C, the contact finger 56 thereon, the contact 58, the terminal 22, the terminal bar 18, the ear 26, the thermostatic strip A and the terminal screw 40 to the other side of the line 88. As the current passes through the thermostatic strip A the strip becomes heated and tends to bend toward the opposite strip B. As it does so the mica washer 42 carried by its tip contacts the snap spring C and tends to force the latter toward terminal 24. This action is resisted by the spring C until the strip A is heated sufficiently so that the force exerted by the strip in bending exceeds the resistive force of the spring C, at which time the spring, by reason of its construction, snaps over to its position illustrated in Fig. 6, thus removing the contact 58 from the terminal 22 and causing it to make electrical connection with the terminal 24.

When this occurs current will flow from terminal 86 through the toaster heating coils 90, the terminal screw 60, the snap spring C, the contact finger 56, the contact 58, the terminal 24, the terminal bar 29, the ear 28, the thermostatic strip B and the terminal screw 40 to the other side of the line 88. It will be noted that current will no longer pass through the thermostatic strip A, and consequently that strip will be permitted to cool so as to be ready for re-energization immediately following the determination of the timing interval. During the determination of the timing sub-interval now under discussion, only the thermostatic strip B is being heated and as it heats it tends to bend toward the strip A and the mica washer 42 carried by the strip B contacts the spring C and tends to force it back to its position of Figs. 1 and 5. When the bending force exerted by the strip B exceeds the resilient resistance of the spring C, the spring will snap back to its position of Fig. 1, and the contact finger 56 will once again attempt to make electrical connection between contact 58 and terminal 22.

However, at the moment when the spring C was forced by the strip A from its position of Fig. 5 to its position of Fig. 6, the obstruction to the return of the button 72 to its operative position presented by the tip of the contact finger was removed and, under the influence of the spring 80, the button 72 returned to its operative position. Consequently, when the strip B snapped the spring C back to its position of Fig. 1, electrical connection between the contact 58 and the terminal 22 was prevented. Thus the circuit through the toaster heating coils 90 was opened, and the toaster timing interval was determined.

Since the strip A has had an opportunity to cool during heating of the strip B, and since the resistances of the various elements and their heat dissipating characteristics are so chosen as to give the strip A an opportunity to cool to its desired initial temperature during the heating period of the strip B, the timer is in condition for immediate re-actuation should that be desired.

The duration of the time interval is controlled in a very simple manner. Screw 92 is threaded through the side wall 10, and is provided at its inner end with an insulated cap 94 adapted to bear against the adjustor spring 52. Adjustment of the screw 92 will determine, via adjustor spring 52, the amount of initial buckling to which the snap spring C is subjected, and will therefore determine the amount of the resistance which that spring will exert against being snapped to its other position. As this resistance is increased, the strips A and B will have to exert a stronger force on the spring C in order to cause it to snap from one of its positions to the other, and this will necessitate a longer heating time.

Figure 7:
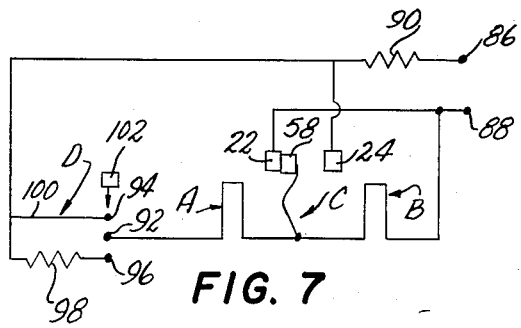
Fig. 7 represents an alternative arrangement in which the thermostatic elements are alternately shorted out of the circuit rather than open circuited, Fig. 7 also illustrating a novel thermostatic initiating device.
Figure 8:
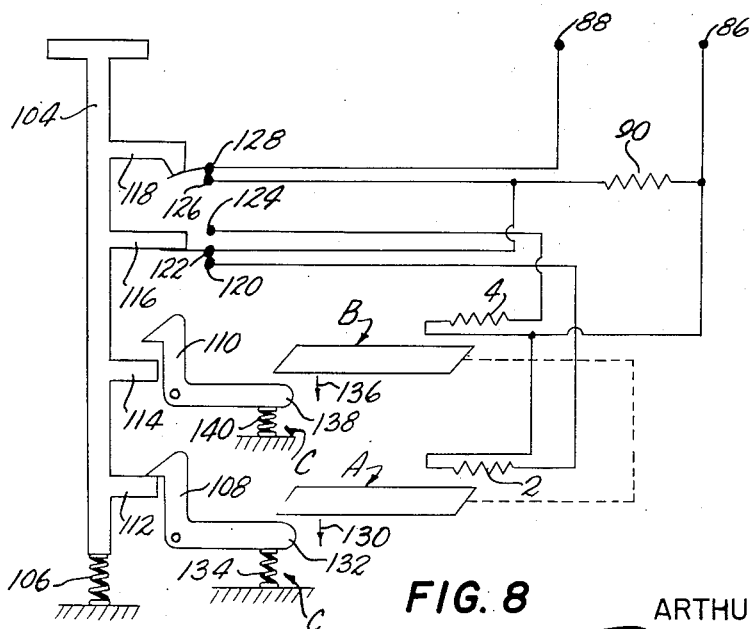
Fig. 8 illustrates in schematic form an adaptation of the timer of my invention to control the mechanical motion of an element.

Fig. 7 illustrates an alternate circuit arrangement in which the sequential heating of strips A and B is controlled not by connecting first the one and then the other to an electrical source, as was the case with the arrangement of Figs. 5 and 6, but rather by alternately short circuiting them with respect to said source. The position of the contacts illustrated in Fig. 7 correspond to that of Fig. 5. If we assume that the thermostatic initiating device D (hereinafter to be described in detail) is closed, current will flow from terminal 86 through toaster heating coil 90, thermostatic strip A, snap spring C, contact 58, terminal 22 and out to the other end of the line 88, thus energizing or heating thermostatic strip A. Thermostatic strip B is short circuited and no heating of it will take place. When the strip A has heated and therefore bent sufficiently to cause spring C to snap to its other position in which contact 58 is removed from terminal 22 and caused to make connection with terminal 24, the current will flow as follows: From terminal 86 through toaster heating coils 90, terminal 24, contact 58, snap spring C and thermostatic strip B to the other end of the line 88. The thermostatic strip A will be short circuited, and therefore will cool while the strip B is heating.

The thermostatic initiating means D illustrated in Fig. 7 comprises a movable contact 92 electrically connected to the thermostatic strip A and interposed between movable contact 94 and a third and preferably fixed contact 96. It is spring biased away from contact 96 to its position shown in Fig. 7. Contact 96 is connected to terminal 86 by means of shunting resistor 98, and contact 94 is connected to terminal 86 either directly by thermostatic strip 100 or by a heating element for such a strip. The normal position of contact 94, that is, its position when strip 100 is cool, is as shown in Fig. 7, removed from contacts 92 and 96. To initiate the timing interval, push button 102 is pressed in the direction indicated by the arrow to make electrical connection between contacts 94 and 92. When this occurs a large surge of current will pass through the thermostatic strip 100 heating it rapidly and causing it to flex so as to maintain electrical connection between contacts 92 and 94 and urge both of said contacts into electrical connection with contact 96. When this takes place resistor 98 is shunted across the thermostatic strip 100, thus reducing the current flow therethrough preferably to an amount just sufficient to keep the strip hot enough to maintain all three contacts in electrical connection. It will be clear that once the strip 100 has heated sufficiently to maintain electrical connection between contacts 92 and 94, and this takes place almost instantaneously, the push button 100 may be released but the circuit through the toaster heating coils 90 will still remain closed.

When, urged by the bending of the thermostatic strip A as already explained, the snap spring C moves from its position of Fig. 7 to a position in which electrical connection is made between contact 58 and terminal 24, the thermostatic initiating means D as well as the thermostatic strip A will be short circuited and no current will flow therethrough. When this takes place the thermostatic strip 100 will cool, and as it does so contact 92 will be withdrawn from contact 96 and then contact 94 will be withdrawn from contact 92. Thereafter, when under the influence of the bending of thermostatic strip B, the snap spring C returns to its position of Fig. 7, the circuit through thermostatic strip A and heating coil 90 will be open and therefore no current will pass through the toaster heating coils 90 unless and until the push button 102 is again actuated.

Fig. 8 illustrates schematically the employment of my timer to control the mechanical action of an operating member 104 which is biased by spring 106 to move from the position illustrated in Fig. 8 in which it is engaged by pivoted latch 108, and hereafter termed an initial timing position, to an intermediate position in which it is engaged by pivoted latch 110, and then to a final position in which it is engaged by neither latch. The operating member 104 may, for example, move the platform of a pop-up toaster by linkages well-known in the art. This member is provided with a pair of arms 112 and 114 so arranged as to be engaged by the latches 108 and 110 when the member 104 is in its initial timing position or its intermediate position respectively, and is also provided with arms 116 and 118 adapted to control electrical connection between contacts 120, 122, 124, 126 and 128. When the operating member is depressed to its initial timing position, as for example when a piece of toast is inserted in the toaster and the platform is pushed down to toasting position, arm 118 will cause electrical connection between contacts 126 and 128 so that current flows from terminal 86 through the toaster heating coils 90, contact 126 and contact 128 to the other terminal 88. At the same time arm 116 will cause contacts 120 and 122 to meet so that current will also flow from terminal 86 through the heating coil 2 for the thermostatic strip A, and then through contacts 120, 122, 126 and 128 to the other terminal 88. As the thermostatic strip A is thus heated it will tend to flex in the direction of the arrow 130 and will contact the rear end 132 of the latch 108 and will tend to pivot said latch against the influence of biasing spring 134 until the operating member 104 is released. Under the influence of spring 106 the operating member 104 will then move upward until arm 114 is engaged by latch 110, at which time the operating member 104 will be retained in its intermediate position. When this takes place arm 116 will permit contact 122 to be removed from contact 120 and will permit it to be spring urged against contact 124. The upward motion of the operating member 104 will, however, not be sufficient to permit contacts 126 and 128 to part. Therefore, current will flow as before through the heating coils 90 of the toaster and current will also flow from terminal 86 through heating coil 4 for the thermostatic element B, and then through contacts 124, 126 and 128 to the other terminal 88. It will be noted that the circuit to heating coil 2 for thermostatic element A will be open, and the strip A will therefore be permitted to cool. As the strip B bends in the direction of the arrow 136, it will contact the end 138 of the latch 110 and will tend to move it down against the pressure of biasing spring 140 until the latch 110 is disengaged from the arm 114, at which time the operating member 104 will be urged by spring 106 upwards to its final position, this motion being sufficient to permit the contacts 126 and 128 to open, thus de-energizing the heating coils 90 of the toaster and also de-energizing the heating coil 2 for the thermostatic strip B.

Figure 9:
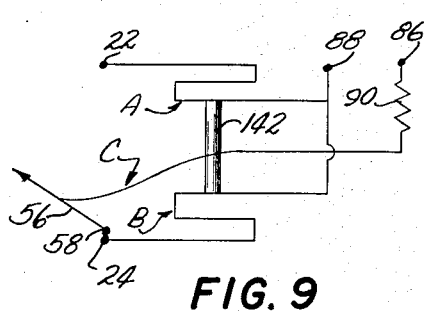
Fig. 9 schematically indicates a modification of the arrangement of Figs. 5 and 6 in which a rigid member is interposed between the bending portions of the thermostatic elements.

In Fig. 9 a rigid member 142 is shown interposed between and in simultaneous contact with the bending portions A and B. Since in this arrangement the strips A and B tend to bend toward one another, the presence of this rigid member 142 will affect the timing action of those strips in a manner dependent upon whether the member 142 will or will not conduct heat. If the member 142 is a heat insulator the bending force which the strip A can exert upon the spring C will be dependent not only upon the temperature of the strip A but also upon the temperature of the strip B. The warmer the strip B the more it will, via the member 142, oppose the bending of the strip A and therefore the longer will be the timing interval determined. Thus if the timer be re-actuated immediately upon the completion of the determination of a time interval, the next time interval measured will be of longer duration than the first. While this effect is not desired when the timer is employed with an electric toaster, it may be desired in other applications.

If the member 142 be formed of heat-conductive material, the heat interchange between the strips A and B will be such as to modify their heating and cooling characteristics and consequently their bending characteristics in a relatively complex manner. By suitably designing the member 142 to obtain any desired amount of heat conductivity, the characteristics of the timer may be controlled and modified to suit the requirements of whatever application desired.

The electrical and mechanical arrangements described above are but illustrative of the various forms which my timer may assume depending upon the use to which it will be put. It will be noted that although two thermostatic strips are employed, these strips need not be identical in characteristics nor need they be replaced by identical strips, variations in the strips being accommodated by adjustment of the screw 92. The timer is so constructed as to have the timing action initiated by a momentary impulse or push exerted upon an initiating member D and will, after the determination of the interval to be timed, be in condition for immediate re-actuation. Many variations in specific design, either mechanical or electrical, may be made without departing from my invention as defined in the appended claims.

I claim:

1. In a timer, a pair of heat-responsive elements, means for separately heating said elements, means for causing said elements to overcome force during their heating period, means for varying the amount of force to be overcome to vary the heating time, and means for heating said elements alternatively in succession, whereby the time interval measured is equal to the sum of two sub-intervals, each of said sub-intervals being determined by the heating time of a separate heat-responsive element.

2. A timer which determines the time interval by adding two sub-intervals, each of said sub-intervals being determined by a separate thermostatic element which overcomes force during its heating period, comprising two thermostatic elements operable in sequence, circuits therefor, means for setting the timer, automatic means operable at the conclusion of the heating of the first thermostatic element for terminating the heating of the same and for commencing the heating of the second thermostatic element, and means for varying the heating times of each of said thermostatic elements by varying the amount of force to be overcome by said thermostatic elements during their heating.

3. A timer comprising a support, a pair of bimetallic strips each of which tends to bend when heated, heating means for said strips, a single mechanical resistance means arranged so as to be contacted by each strip as it bends and to resist said bending until overcome by the force of said bending, and means controlled by said mechanical resistance means for exposing first one and then the other of said strips to heating, only one strip being exposed to heating at a time.

4. A timer comprising a support, a pair of bimetallic strips arranged thereon in parallel and spaced apart relationship, each of said strips tending to bend toward the other when heated, heating means for said strips, mechanical resistance means arranged between said strips so as to be contacted by each as it bends and to resist said bending until overcome by the force of said bending, and means controlled by said mechanical resistance means for exposing first one and then the other of said strips to heating, only one strip being exposed to heating at a time.

5. A timer comprising a support, a pair of bimetallic strips arranged thereon in parallel but spaced apart relationship, each of said strips tending to bend toward the other when heated, separate heating means for each of said strips, mechanical resistance means arranged between said strips so as to be contacted by each as it bends and to resist said bending until overcome by the force of said bending, and means controlled by said mechanical resistance means for alternately energizing said heating means.

6. A timer comprising a support, a source of electricity, a pair of bimetallic strips each of which tends to bend when heated, separate electrical heating means for each of said strips, a single mechanical resistance means arranged so as to be contacted by each strip as it bends and to resist said bending until overcome by the force thereof, and means controlled by said mechanical resistance means for alternately electrically energizing said separate electrical heating means.

7. The timer of claim 6, in which the means controlled by said mechanical resistance means alternately connects said electrical heating means with said source of electricity.

8. The timer of claim 6, in which the means controlled by said mechanical resistance means alternately short-circuits said electrical heating means from said source of electricity.

9. The timer of claim 3, in which the mechanical resistance means is adjustable to vary the resistance it exerts to the bending of said strips.

10. The timer of claim 4, in which the mechanical resistance means is adjustable to vary the resistance it exerts to the bending of said strips.

11. The timer of claim 6, in which the mechanical resistance means is adjustable to vary the resistance it exerts to the bending of said strips.

12. A timer comprising a frame, a pair of spaced opposed terminals, a pair of spaced opposed bimetallic strips between said terminals and arranged to bend toward one another when heated, a spring element adapted to be forced by each of said strips toward the other as said strips bend, a contact finger on said spring element adapted to make contact with one or the other of said terminals depending upon the direction in which said spring has been forced, separate heating means for each of said strips, and circuit connections between said terminals, said contact finger and said heating means, whereby said heating means are alternately energized and de-energized by the action of said strips on said spring element.

13. A timer comprising a frame, a pair of spaced opposed terminals, a pair of spaced opposed bimetallic strips between said terminals and arranged to bend toward one another when heated, a spring element adapted to be forced by each of said strips toward the other as said strips bend, means for varying the tension of said spring element, a contact finger on said spring element adapted to make contact with one or the other of said terminals depending upon the direction in which said spring has been forced, separate heating means for each of said strips and circuit connections between said terminals, said contact finger and said heating means whereby said heating means are alternately energized and de-energized by the action of said strips on said spring element.

14. In the timer of claim 12, an initiating mechanism comprising a first means for retaining said contact finger out of engagement with one of said terminals, means for moving said first means to inoperative position, whereby the determination of said timing interval is initiated, and means for resetting said first means in operative position during the determination of said timing interval.

15. In the timer of claim 12, an initiating mechanism comprising an element mounted on said frame so as to articulate between an operative position in which it retains said contact finger out of engagement with one of said terminals and an inoperative position, biasing means urging said element toward its operative position, and means for moving said element to its inoperative position to initiate the determination of the timing interval.

16. In the timer of claim 12, an initiating mechanism comprising an element mounted on said frame so as to articulate between an operative position in which it retains said contact finger out of engagement with one of said terminals and an inoperative position, biasing means urging said element toward its operative position, and means for moving said element to its inoperative position to initiate the determination of the timing interval, said contact finger and said element cooperating to maintain the latter in inoperative position until said contact finger has been moved to the other of said terminals.

ARTHUR M. COHEN.

REFERENCES CITED

The following references are of record in the file of this patent:

UNITED STATES PATENTS

| Number | Name | Date |
| --- | --- | --- |
| 1,348,746 | Schepeler | Aug. 3, 1920 |
| 1,908,676 | Appelberg | May 16, 1933 |
| 1,974,188 | Martin | Sept. 18, 1934 |
| 2,237,705 | Kohl | Apr. 8, 1941 |
| 2,246,724 | Eaton | June 24, 1941 |
| 2,325,551 | Scharf | July 27, 1943 |
| 2,362,751 | Huck | Nov. 14, 1944 |
| 2,362,752 | Huck | Nov. 14, 1944 |
| 2,422,199 | Koci | June 17, 1947 |